(12) United States Patent
Ebenhoch et al.

(10) Patent No.: US 7,281,618 B2
(45) Date of Patent: Oct. 16, 2007

(54) TRANSMISSION AND METHOD FOR CONTROLLING A TRANSMISSION WITH AT LEAST ONE SHIFT CONTROL ELEMENT

(75) Inventors: Michael Ebenhoch, Friedrichshafen (DE); Detlef Baasch, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/486,327

(22) Filed: Jul. 13, 2006

(65) Prior Publication Data

US 2006/0249346 A1 Nov. 9, 2006

Related U.S. Application Data

(62) Division of application No. 10/650,201, filed on Aug. 28, 2006, now Pat. No. 7,108,115.

(30) Foreign Application Priority Data

Sep. 25, 2002 (DE) ................ 102 44 523

(51) Int. Cl.
*F16D 23/02* (2006.01)
(52) U.S. Cl. ........................................ 192/53.1
(58) Field of Classification Search ........... 192/53.1, 192/218, 219, 220, 225; 74/339; 475/303, 475/323
See application file for complete search history.

(56) References Cited

U.S. PATENT DOCUMENTS

| 2,907,428 A | 10/1959 | Erwin et al. |
| RE31,296 E | 7/1983 | Richards |
| 4,569,252 A | 2/1986 | Harper |
| 4,821,591 A | 4/1989 | Adler |
| 5,911,644 A | 6/1999 | Williams |

FOREIGN PATENT DOCUMENTS

| DE | 738 514 | 7/1943 |
| DE | 25 38 781 | 3/1977 |
| DE | 100 40 116 A1 | 2/2002 |

*Primary Examiner*—Saul Rodriguez
(74) *Attorney, Agent, or Firm*—Davis Bujold Daniels, P.L.L.C.

(57) ABSTRACT

A transmission is described, in particular an automatic transmission for a vehicle, having at least one shift control element formed at least of a second shift control element half that can be brought into active frictional engagement with a first shift control element half. The shift control element halves can be connected to non-rotating and rotating transmission components, and a positive-locking coupling device is provided at least between the first shift control element half and the transmission components that can be connected thereto. The coupling device also comprises a synchromesh device. In addition, a method is described for controlling a transmission that has at least one shift control element and two shift control element halves which can be brought into active frictional engagement. When it is necessary to close the shift control element, the coupling device is synchronized by a synchromesh device, a positive-locking function of the coupling device is closed, and the halves of the shift control element are frictionally engaged.

7 Claims, 3 Drawing Sheets

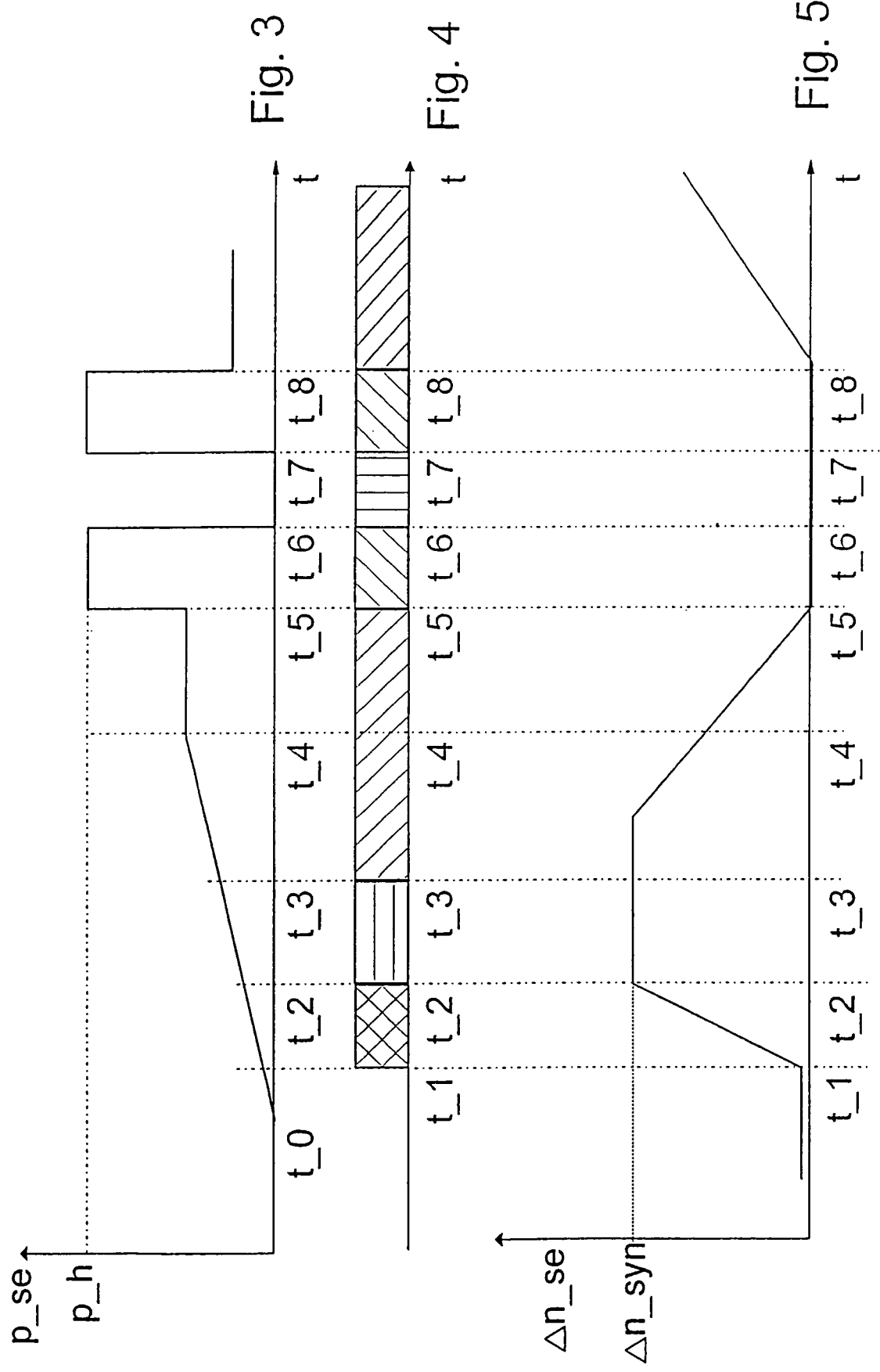

TRANSMISSION AND METHOD FOR CONTROLLING A TRANSMISSION WITH AT LEAST ONE SHIFT CONTROL ELEMENT

The present Application claims benefit and is a divisional of application Ser. No. 10/650/201 filed on Aug. 28, 2006, now U.S. Pat. No. 7,108,115.

FIELD OF THE INVENTION

The invention concerns a transmission and a method for controlling a transmission with at least one shift control element, which has at least two shift control element halves that can be brought into active, positive-locking engagement with one another.

BACKGROUND OF THE INVENTION

From DE 100 40 116 A1 a transmission of the type described at the start is known, in which a positive-locking coupling is provided between an inner disc carrier of a multiple-disc brake and a planetary gearwheel support of a planetary gear assembly. When the disc brake is open the positive-locking coupling is opened to uncouple transmission components from the disc brake in order to reduce drag torques.

When it is required to close the multiple-disc brake, the positive-locking coupling is closed without force by an axial piston so that the transmission components or planetary gear support and the transmission components, in turn, actively connected thereto are coupled to an inner disc carrier of the disc brake.

Thereafter a disc pack of the multiple-disc brake is acted upon by the axial piston with an adjustable closing force so that, by virtue of the pressure exerted by the axial piston the braking torque can be gently and continuously increased, so that no appreciable jerking or the like takes place.

A disadvantage in this, however, is that the positive-locking coupling between the inner disc carrier of the disc brake and the planetary gearwheel support of the planetary gear assembly can only be closed comfortably when the rotation speeds of the said inner disc carrier and planetary gearwheel support are equal.

If there is a speed difference between the inner disc carrier and the planetary gearwheel support, the positive-locking coupling cannot be engaged or can only be so with a great deal of force and at the same time be very noisily.

To minimize the force required and the noise emission when the positive-locking coupling is closed, it is necessary for the inner disc carrier and the planetary gearwheel support to be stationary or not rotating, but this considerably restricts the operating range of the system proposed.

Therefore, the purpose of the present invention is to provide a transmission with at least one shift control element and a method for controlling a transmission with at least one shift control element, by means of which the drawbacks of the prior art are avoided.

SUMMARY OF THE INVENTION

According to the invention, since the coupling device in the transmission is additionally made with a synchromesh device and before the positive-locking element of the coupling is closed, it can be synchronized and the positive-locking element of the coupling can then be engaged without noise emission and without large force.

Furthermore, the construction of the coupling with a synchromesh has the advantage that the positive-locking action of the coupling can be engaged in any operating conditions, i.e., with any speed difference between the two halves of the positive-locking device, since such differences can be equalized by the synchromesh in a simple way.

In addition, drag torques that occur due to fluid friction between the halves of the shift control element when the latter is open, are reduced because the transmission components of at least one half of the shift control element are uncoupled when the coupling is open, and the drag torques, occurring at the synchromesh, are considerably smaller than those between the halves of the shift control element when the transmission components are coupled.

This, in turn, results from the fact that the synchromesh is made with a low moment of inertia, since it is not used to transmit a force flow in the transmission but only to equalize speed differences, and its dimensions are, therefore, smaller. Thus, when the shift control element is open a speed difference between the halves is reduced or completely eliminated, and this also leads to a reduction of power loss in the transmission.

The method, according to the invention, advantageously makes it possible, when a shift control element is open, to uncouple transmission components from one of its halves so that drag torques between the shift control element halves are avoided—especially at low operating temperatures.

Moreover, the method, according to the invention, offers the possibility of engaging a shift control element of such construction in any operating conditions of a transmission to establish a particular transmission ratio of the transmission, since the positive-locking function of the coupling can be effected in a simple way by the prior synchronization of the coupling.

BRIEF DESCRIPTION OF THE DRAWINGS

The invention will now be described, by way of example, with reference to the accompanying drawings in which:

FIG. 3 is schematically represented variation with time of a pressure applied to the shift control element's halves during a shift cycle;

FIG. 4 is a representation corresponding to the pressure variation of FIG. 3, showing the various conditions of the shift control element during a shift cycle;

FIG. 5 is a time variation of a rotation speed difference between the first and second halves of the shift control element during a shift cycle;

DETAILED DESCRIPTION OF THE INVENTION

Figure 1:
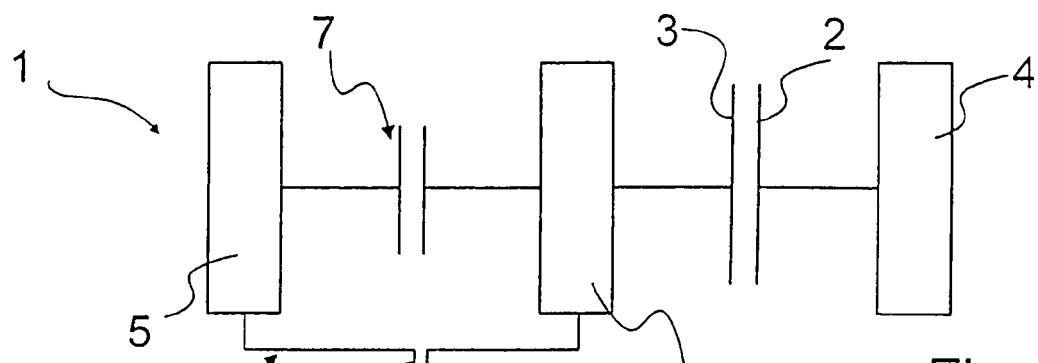
FIG. 1 is highly schematic representation of a shift control element with a coupling device, constructed with a synchromesh.

FIG. 1 shows a shift control element 1 of a transmission (not illustrated in further detail), which is constructed as a variable-speed automatic transmission. The shift control element 1 is provided in order to engage one or more gears of the variable-speed automatic transmission, and is engaged in or disengaged from a power train as a function of a required transmission ratio of the variable-speed automatic transmission. The shift control element 1 comprises a first shift control element half 2 and a second shift control element half 3, which can be brought into force-locking or frictional engagement with one another.

The halves 2, 3 of the shift control element 1 are connected to non-rotating 4 and rotating 5 transmission components. Between the first half 2 of the shift control element 1 and the rotating transmission components 5 connected to it, a positive-locking coupling device 6 is provided, which is also made with a synchromesh device 7.

In the closed condition of the shift control element 1, the two halves 2, 3 thereof are in active, form-locked engagement with one another in such manner that a force flow is transmitted from the rotating transmission components 5 to the non-rotating transmission components 4 which, in the present case, are connected to a transmission housing of the variable-speed automatic transmission, without any rotation speed difference between the two halves 2, 3 of the shift control element 1.

At the same time a positive-locking element 8 of the coupling device 6 and its synchromesh device 7 is closed. If a need arises to open the shift control element 1 or to disengage it, the positive-locking function between the two halves 2, 3 of the shift control element 1 is released until almost no torque is any longer transmitted via the shift control element halves 2, 3. In this condition of the shift control element 1, there is a speed difference between its two halves 2, 3 which, by virtue of the hydraulic oil present between the two halves 2, 3 of the shift control element 1 leads to drag torques and hence to power losses that reduce the efficiency of the variable-speed automatic transmission.

To reduce the speed difference between the two halves 2, 3 of the shift control element 1 and so decrease the drag torques, the coupling device 6 is opened so as to uncouple the rotating transmission components from the first half 2 of the shift control element 1. For this, first the positive-locking element 8 and then the synchromesh device 7 of the coupling device 6 are opened, so that the rotating masses of the rotating transmission components 5, which during the operation of the variable-speed automatic transmission are rotating at a speed corresponding to a new transmission ratio of the variable-speed automatic transmission to be established, are uncoupled from the first half 2 of the shift control element 1 and are no longer moving it relative to the second half 3 thereof.

The result of this is that, due to the aforesaid fluid friction between the two shift control element halves 2, 3, the first half 2 of the shift control element 1 is no longer rotating or only so at a greatly reduced speed relative to the second half 3, so that drag torques between the shift control element halves 2, 3 are entirely avoided or considerably reduced.

The speed differences are then transferred from the shift control element halves 2, 3 to the area of the synchromesh device 7 of the coupling device 6. In its open condition the synchromesh device 7 causes drag torques, but because of the smaller friction surfaces of its components and the reduced friction area compared with the shift control element halves 2, 3, these torques are much lower than the torques between the shift control element halves 2, 3.

If it becomes necessary to engage the shift control element 1 in a force flow of the variable-speed automatic transmission, because of a particular operating situation of the variable-speed automatic transmission or because the driver of a vehicle so wishes, the coupling device 6 is first synchronized by the synchromesh device 7 and the positive-locking element 8 is then closed when the two positive-locking halves of the coupling device 6 are at equal speed. This again couples the rotating transmission components 5 to the first half 2 of the shift control element 1, and the latter can then finally be closed by establishing the friction-force engagement between the two halves 2, 3 of the shift control element 1 which can engage frictionally with one another.

Figure 2:
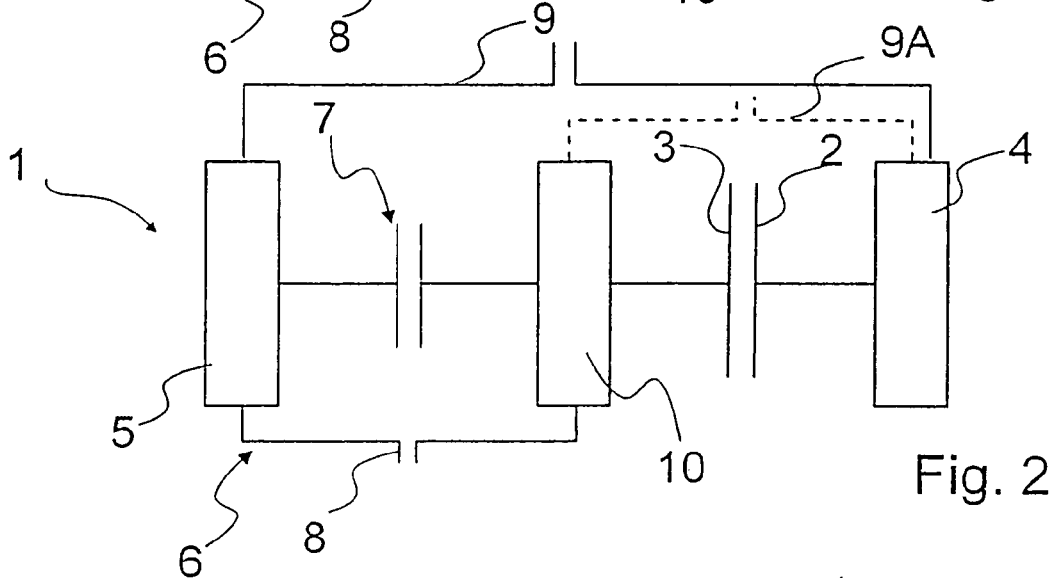
FIG. 2 is a representation of FIG. 1, in which a positive-locking element is provided to bridge across a frictional engagement between the shift control element halves of the shift control element.

FIG. 2 shows the shift control element 1 of FIG. 1, with a positive-locking element 9 arranged between the rotating transmission components 5 and the non-rotating transmission components 4. When the positive-locking element 9 is closed a force flow can be transmitted from the rotating transmission components 5 to the non-rotating transmission components 4. At the same time, this provides the possibility of reducing the force connection between the two shift control element halves 2, 3 in order to reduce energy losses that occur at a hydraulic pump of a hydraulic system of the variable-speed automatic transmission if the force connection between the two halves 2, 3 of the shift control element 1 is maintained, and thereby improving the efficiency of the variable-speed automatic transmission.

The friction-force connection between the two shift control element halves 2, 3 and the positive-locking element 9 can be adjusted during a shift cycle of the shift control element 1 by means of a control device of the variable-speed automatic transmission (not shown in detail), in such manner that the shift control element 1 can be engaged and disengaged without interruption of the traction force, i.e., as a change-under-load. In the present case, the term shift cycle is understood to mean the time sequence comprising an engagement phase, which is followed by a phase in which the force flow is transmitted, via the shift control element 1, and finally again by a disengagement phase of the shift control element 1.

During a shift cycle, there occurs a controlled transition between frictional and form-locked force transmission of a torque at the shift control element 1, such that a gear shift involving the said shift control element 1 takes place as a change-under-load without interruption of the traction force, as is preferred when down-shifting under traction or up-shifting with thrust.

In the present case, the positive-locking element 9 of the shift control element 1 is provided with a blocking element (not shown in great detail), which is designed similarly to the synchromeshes of variable-speed automatic transmissions known as such, in that the positive-locking connection cannot be made before synchronization has been established between the two shift control element halves 2, 3 or those of the positive-locking element 9.

In the present case, the shift control element 1 and its halves 2, 3 are made as a multiple-disc brake with a disc pack 16, which, to establish the friction-force engagement, is pressed together by an actuator device (not shown in greater detail in FIGS. 1 and 2). To establish the friction-force engagement in the area of the disc pack 16, the actuator device is acted upon by hydraulic pressure from a hydraulic system of the variable-speed automatic transmission.

As an alternative, it can obviously be provided that the shift control element 1 and its halves 2, 3 are made as a multiple-disc clutch with a disc pack, and this is engaged in a power train of the variable-speed automatic transmission in order to obtain a particular gear.

When the coupling device 6 has been closed and the friction-force connection between the two halves 2, 3 of the shift control element 1 has been established, the positive-locking element 9 is closed. Thereafter, a holding pressure on the disc pack 16 of the shift control element 1 is reduced or entirely disconnected, to save energy.

FIG. 2 also shows another embodiment of the positive-locking element of the shift control element 1, indicated by broken lines and denoted by the index 9A. When the positive-locking element 9A is closed, the transmission housing or the non-rotating transmission elements 4 are connected to intermediate masses 10 of the coupling device 6 arranged between the rotating transmission components 5 and the non-rotating transmission components 4. The version with the element 9A offers the same advantages as the use of the positive-locking element 9 and the two versions of the positive-locking element 8, 9 are also manipulated in the same way.

Below, the sequence of a shift cycle of the shift control element 1 will be described in greater detail with reference to FIGS. 3, 4 and 5. During a shift cycle there is a controlled transition between a frictional and a positive-locking force transmission of a torque at the shift control element 1.

Referring to FIG. 3, the variation of a pressure or control pressure $p\_se$ of the shift control element 1 with time t is shown, the said pressure being exerted indirectly by a hydraulic pump of a hydraulic system of the variable-speed automatic transmission upon the two halves 2, 3 of the shift control element 1.

The representations, shown in FIGS. 4 and 5, correspond to the variation of the control pressure $p\_se$ shown in FIG. 3, the representation of FIG. 4 illustrating a condition of the shift control element 1, i.e., of the coupling device 6, the form-locking element 9 or 9A, and the halves 2, 3 of the shift control element 1. In the present case the term "condition" is understood to mean a transmission ability of the synchromesh device 7, the positive-locking function 8, between the halves 2, 3 of the shift control element 1 and the positive-locking element 9 or 9A which, in this case, is made as a claw coupling and, in each case, the manner in which a force flow is transmitted via the shift control element 1. FIG. 5 shows a variation of the speed difference between the two halves 2, 3 of the shift control element 1 during a shift cycle.

At a time point $t\_0$, all the functional components of the shift control element 1, i.e., the synchromesh device 7, the positive-locking function 8, the halves 2, 3 of the shift control element and the positive-locking element 9 or 9A are open, and no torque is transmitted via the shift control element 1. Between time $t\_0$ and time $t\_1$, the control pressure $p\_se$ is steadily increased along a pressure ramp, whereby the synchromesh device 7 is first brought into engagement and its transmission ability increased. From time $t\_1$ onwards, the synchromesh device 7 is at first operated in a slipping condition in order to synchronize the coupling device 6 or the positive-locking element 8.

From time $t\_1$ onwards, owing to the increasing transmission ability of the synchromesh device 7, the speed difference $\Delta n\_se$ increases steadily and, at a time $t\_2$, reaches a synchronized speed $\Delta n\_syn$ which corresponds to the synchronous speed of the coupling device 6. In this condition of the coupling device 6, the positive-locking element 8 of the coupling device 6 is engaged, and the control pressure $p\_se$ further increases.

With increasing control pressure $p\_se$, from a time $t\_3$ onwards, the transmission ability between the two halves 2, 3 of the shift control element 1 is increased and, as a result, the said halves 2, 3 also begin operating in slipping mode.

From a time point between $t\_3$ and $t\_4$ but not defined more closely, the speed difference $\Delta n\_se$ decreases steadily owing to the increasing transmission ability of the halves 2, 3 of the shift control element 1 and reaches the value zero at the time $t\_4$. When the speed difference $\Delta n\_se$ between the two halves 2, 3 of the shift control element 1 has been equalized, the said two halves 2, 3 and the form-locking element 9 or 9A are all synchronized. Between times $t\_4$ and $t\_5$, the control pressure $p\_se$ is held at least approximately constant. This period constitutes a so-termed pressure compensation phase of the shift control element 1, which is preceded by a first filling phase of the shift control element 1 during a first shift phase, i.e., during the period between times $t\_0$ and $t\_1$.

At time $t\_5$, when the synchronous condition of the shift control element 1 between its two halves 2, 3 is reached, the control pressure $p\_se$ is abruptly increased to a holding pressure $p\_h$ of the shift control element 1. The halves 2, 3 of the shift control element 1 are then pressed together in such manner that a torque on the shift control element 1 is transmitted in a form-locked and complete way from the rotating transmission components 5 to the non-rotating transmission components 4.

In this condition of the shift control element 1, a signal is emitted by the control unit of the change-under-load transmission or variable-speed automatic transmission, to close the positive-locking shift element 9 or 9A. The closing process of the positive-locking element 9 or 9A is completed at the latest by time $t\_6$, and the control pressure $p\_se$ of the shift control element 1 is reduced to the pressure level at time $t\_0$. This eliminates the transmission ability between the two halves 2, 3 of the shift control element or the friction-force engagement between them.

In a shift phase of the shift cycle following the above, between times $t\_6$ and $t\_7$, a torque coming from the rotating transmission components 5 is transmitted to the non-rotating transmission components 4 via the positive-locking element 9 or 9A and the positive-locking element 8.

Obviously, a person with knowledge of the field may decide to completely eliminate the transmission ability between the shift control element halves 2, 3 when its positive-locking element 9 or 9A is closed, or to reduce it to a defined threshold value. In this regard, incomplete elimination of the transmission ability between the shift control element halves 2, 3 has the advantage compared with complete elimination, that a subsequent increase of the transmission ability up to full friction-force engagement between the shift control elements 2, 3 requires a shorter control time.

At a time point $t\_7$ and as a function of a given operating condition of the variable-speed automatic transmission or because the driver so wishes, if it becomes necessary to change gear and, therefore, to disengage the shift control element 1 before the positive-locking element 9 or 9A is opened the control pressure $p\_se$ is again abruptly increased to the holding pressure $p\_h$, so that the two shift control element halves 2, 3 are again in friction-force engagement with one another.

In this condition of the shift control element 1, the positive-locking element 9 or 9A is opened and the torque on the shift control element 1 is transmitted via the friction-force engagement of the shift control element halves 2, 3 to the non-rotating transmission components 4 to the same extent as via the positive-locking element 9 or 9A.

At a time point $t\_8$ when the transmission ability between the shift control elements 2, 3 by virtue of friction-force engagement is complete and at the same time the positive-locking element 9 or 9A is securely open, the control pressure $p\_se$ is abruptly reduced to a predetermined pressure value. This reduces the transmission ability between the shift control element halves 2, 3 and slippage occurs between the two halves 2, 3 of the shift control element 1. At the same time, the speed difference Δn_se increases to a value established at the shift control element 1 or between its halves 2, 3 as a function of the extent of the transmission ability and of the newly engaged gear or gear speed in the variable-speed automatic transmission.

The hatched areas in FIG. 4 denote areas in each case representing one of the conditions of the shift control element 1 or the individual functional components described above. The first, cross-hatched area between times t_0 and t_1 represents the condition of the shift control element 1 and, in particular, the coupling device 6, in which the coupling device 6 is being synchronized by the synchromesh device 7, the shift control elements 2, 3 are not yet in active engagement with one another and no torque can yet be transmitted via the shift control element 1.

A second hatched area between times t_2 and t_3 shows the condition of the coupling device 6 in which the positive-locking element 8 of the coupling 6 is closed and the shift control element halves 2, 3 are in idling contact such that an applied torque cannot yet be supported on the transmission housing.

The third hatched area between times t_3 and t_5 represents the condition of the shift control element 1 in which a reduced force flow is transferred between the rotating transmission components 5 and the non-rotating transmission components 4 via slipping shift control element halves 2 and 3.

The fourth hatched area between times t_5 and t_6 represents the condition of the shift control element 1 in which there is friction-force engagement between the two shift control element halves 2, 3 and a torque applied to the shift control element 1 is fully transmitted between its halves 2 and 3 without slip. During this phase of the shift cycle, the positive-locking element 9 or 9A is closed; this closure of the said element 9 or 9A taking place at the latest by time t_6.

Furthermore, the positive-locking element 9 or 9A is opened again no earlier than at time t_7, when at time t_7 there is already full transmission ability due to the friction-force engagement between the shift control element halves 2 and 3. The fifth area hatched with vertical lines between times t_6 and t_7 represents the condition of the shift control element 1 in which the force flow is transmitted by the said element 1 by virtue of the engagement of the positive-locking element 9 or 9A, and at the same time, the control pressure p_se has been reduced. In this, the transmission ability in the area of the frictional connection between the two shift control element halves 2, 3 is greatly reduced.

In a penultimate shift phase of the shift cycle between times t_7 and t_8, there is again full friction-force engagement between the shift control element halves 2 and 3, and the positive-locking element 9 or 9A is open. In this, the force flow, via the shift control element 1, is transmitted in full due to the frictional engagement between its halves 2 and 3.

From time t_8 onwards, the transmission ability of the shift control element 1 is lower because of the reduced transmission ability of the frictional engagement between the halves 2 and 3 of the shift control element 1, and only a reduced force flow is transmitted in slip operation from the rotating transmission components 5 to the non-rotating transmission components 4. In this condition of the shift control element 1, the level of the force flow transmitted via the shift control element 1 can be controlled by virtue of the adjustable transmission ability of the frictional engagement in the area between the halves 2 and 3 of the shift control element 1.

Figure 6:
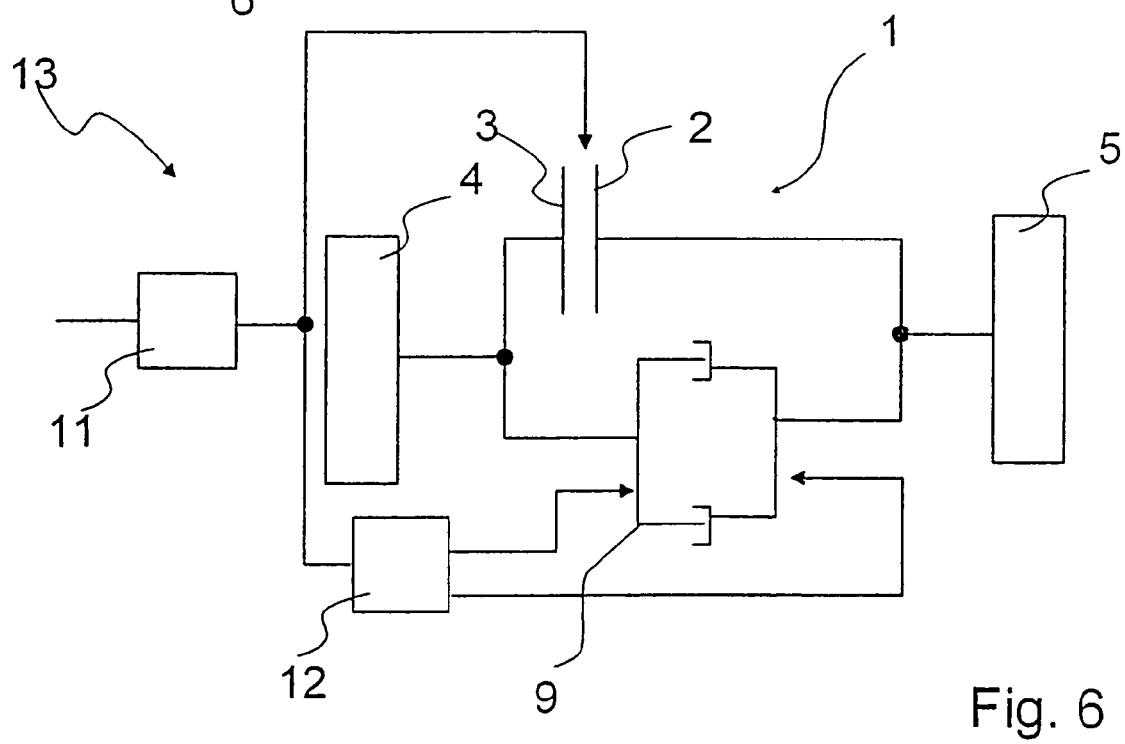
FIG. 6 is a block circuit diagram of an actuator for the actuation of a shift control element.

FIG. 6 shows a block circuit diagram of an actuator 13 for actuating the shift control element 1 with which a controlled transition can be made between the form-locked engagement of the positive-locking element 9 and the frictional engagement between the shift control element halves 2 and 3 during a change-under-load cycle. In this, a functional block 11 symbolically represents a device from which actuation energy is applied to the shift control element 1 or its halves 2 and 3 to be frictionally engaged and to the positive-locking element 9 or 9A. The actuation energy is transmitted directly to the two shift control element halves 2 and 3 for their control, while in contrast the actuation energy for controlling the positive-locking element 9 or 9A passes thereto via a second functional block 12.

The second functional block 12 is constructed with a logic system which alternatively opens or closes the form-locking element 9 whenever the shift control element halves 2 and 3 are actuated. This means that the actuation of the shift control element halves 2 and 3 described earlier between times t_3 and t_5 in the second functional block 12, which in this case is made as a switching flip-flop, to first close the positive-locking element 9 or 9A at time t_6. The renewed establishment of force engagement between the shift control element halves 2 and 3 by the holding pressure p_h between times t_7 and t_8 leads to opening of the positive-locking element 9, at the latest at time t_8.

At time t_8, therefore, there exists the condition described earlier in which the shift control element 1 has reduced transmission ability between its halves 2 and 3 while the coupling device 6 is in form-locking element 8. In a manner known as such, the transmission ability of the shift control element 1 can be adjusted by controlling the transmission ability in the area of the frictional engagement between the two halves 2 and 3 of the shift control element. At the same time, the transmission ability of another shift control element of the variable-speed automatic transmission can be adjusted, which must be brought into operation in order to engage a new gear in the variable-speed automatic transmission without interruption of the traction force.

The result of the actuation strategy described above is that the functional components of the shift control element 1, i.e., its two halves 2 and 3 and the positive-locking element 9, can be controlled by a common actuator system, whereby advantageously, structural space is saved and cost-effective production of the variable-speed automatic transmission is ensured.

With the method described above, in variable-speed automatic transmissions overlap gear shifts known as such can be carried out under load. Furthermore, when the engagement of a shift control element to be engaged has been completed, an actuation pressure or closing force for a friction-locking element or friction-locking shift control element of a variable-speed automatic transmission can be advantageously reduced, whereby the efficiency of the variable-speed automatic transmission is improved.

Figure 7:
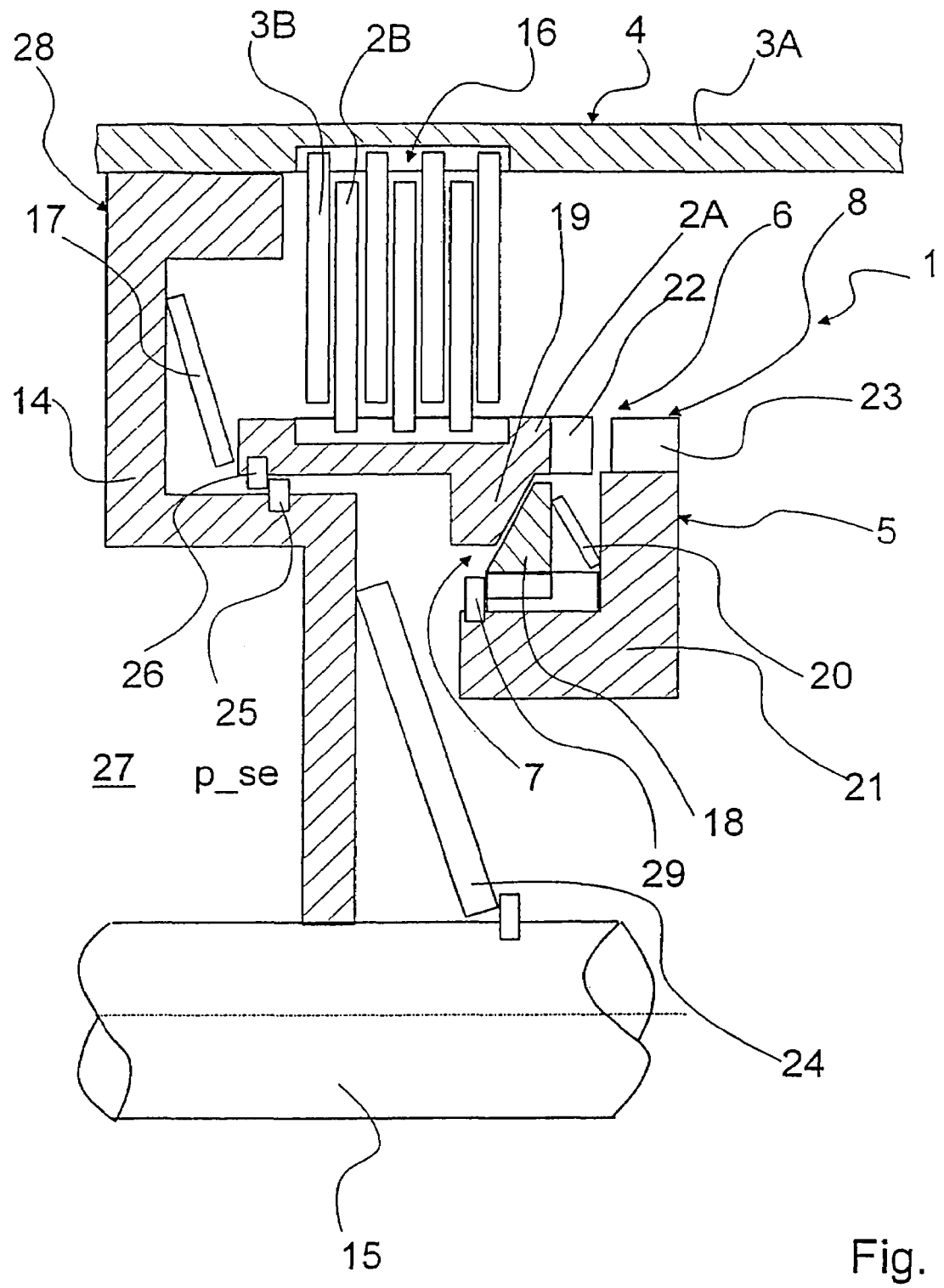
FIG. 7 is a schematic representation of the shift control element of FIG. 1 with an actuator to actuate the shift control element.

Referring to FIG. 7, a design embodiment of the transmission according to the invention, is schematically illustrated in a partial view, in which the shift control element halves 2 and 3 and the coupling device 6 are controlled by a common actuator 28. In the description of FIG. 7, for the sake of clarity and for a better understanding, components of the same structure or with the same function as those in the descriptions of FIGS. 1 to 6 are denoted by the same index numbers.

The actuator 28 is made with a hydraulic piston unit 14 which can be acted upon on the side facing away from the shift control element 1 by the control pressure p_se of a pressure chamber 27. In the present case, the shift control element 1 is made as a multiple-disc brake, such that the second half 3 of the shift control element 1 is made as an outer disc carrier 3A which, in this case, is formed by the transmission housing, with outer discs 2B connected so that they can be axially displaced relative to the outer disc carrier 3A but cannot rotate, and the first half 2 of the shift control element 1 is made with an inner disc carrier 2A and inner discs 2B connected so that they can be axially displaced relative to the inner disc carrier 2A but cannot rotate. The piston unit 14 is arranged on a transmission shaft 15 so that it can be displaced in the axial direction of the transmission shaft 15, and the position in which it is shown in FIG. 7 is its rest position.

Starting from the condition of the shift control element 1 shown in FIG. 7, when it becomes necessary to close the shift control element 1 the pressure p_se in the pressure chamber 27 is increased in the manner described earlier and the piston unit 14 moves towards the disc pack 16 consisting of the outer discs 3B and the inner discs 2B. Between the piston unit 14 and the inner disc carrier 2A is arranged a first spring device 17 in a prestressed fitting position which, in the present case, is made as a cup spring. As the displacement path of the piston unit 14 increases, the inner disc carrier 2A is displaced in the direction of a friction surface element 18 of the synchromesh device 7 made as a synchronizing ring, until a synchronizing area 19 of the inner disc carrier 2A comes in contact or frictional engagement against the synchronizing ring 18.

The synchronizing ring 18 is spring loaded by a second spring device 20 against a planetary gearwheel support 21 of the rotating transmission components 5 in the direction towards the synchronizing area 19 of the inner disc carrier 2A. In the present case, the second spring device 20 is also made as a cup spring, whose spring force pushes the synchronizing ring 18 towards the piston unit 14 as far as an abutment 29 when the coupling device 6 is fully open. The synchronizing ring 18 is mounted on the planetary gearwheel support 21 so that it can be displaced in the axial direction of the transmission shaft 15 but cannot rotate, so that as the displacement path of the piston unit 14 increases the inner disc carrier 2A and the planetary gearwheel support 21 are synchronized by the synchromesh device 7. The planetary gearwheel support 21 in this case constitutes the rotating transmission component 5 and is part of a planetary gear assembly (not shown in greater detail) which is, in turn, in active engagement with other transmission components of the variable-speed automatic transmission.

Before the inner disc carrier 2A engages with its toothed profile 22 in a toothed profile 23 of the planetary gearwheel support 21, any speed difference between the inner disc carrier 2A and the planetary gearwheel support 21 is equalized by the synchromesh device 7. This takes place because with increasing displacement path of the piston unit 14, the second spring device 20 is compressed more and more and by virtue of this progression of the second spring device 20, the friction force between the synchronizing ring 18 and the synchronizing area 19 of the inner disc carrier 2A increases in such a manner that the speed difference between the planetary gearwheel support 21 and the inner disc carrier 2A is equalized by the synchronizing ring 18.

Further increase of the control pressure p_se moves the piston unit 14 further towards the disc pack 16 and the toothed profile 22 of the inner disc carrier 2A engages in the toothed profile 23 of the planetary gearwheel support 21 rotating at the same speed, so that the coupling device 6 is now closed with positive-locking and the rotating transmission components 5 of which, in this case, only the planetary gearwheel support 21 is shown, are coupled to the first half 2 of the shift control element 1.

If the control pressure p_se is still further increased and the piston unit 14 moves further towards the disc pack 16, the outer discs 3B are brought into slipping active engagement with the inner discs 2B. When the control pressure p_se becomes equal to the holding pressure p_h, then the disc pack 16 is pressed together sufficiently for the outer discs 3B to be in contact with the inner discs 2B in full frictional engagement, i.e., with no speed difference and no slip. In this condition of the shift control element 1, a torque applied to the shift control element 1 is transmitted by the planetary gearwheel support 21 via the disc pack 16 to the transmission housing or the outer disc support 3A.

In a control device of the variable-speed automatic transmission, if it becomes necessary to open the shift control element 1, the control pressure p_se is reduced so that the piston unit 14 is pushed back towards the pressure chamber 27 by a third spring device 24 also made as a cup spring. From a defined value of the control pressure p_se onwards, the transmission ability of the disc pack 16 is reduced to the extent that the disc pack 16 or multiple-disc brake changes to slip operation.

After a defined displacement path of the piston unit 14, an entrainment element 25 attached to the piston unit 14 comes in contact with a striker 26 on the inner disc carrier 2A. In the present case, the entrainment element 25 and the striker 26 are each made as spring rings fitted into respective grooves in the piston unit 14 and the inner disc carrier 2A.

As the piston unit 14 is pushed by the spring force of the third spring device 24 further towards the pressure chamber 27, the inner disc carrier 2A is displaced by the entrainment element 25 in the axial direction in such manner that the toothed profile 22 disengages from the toothed profile 23 and the positive-locking element 8 of the coupling device 6 is opened. During this, the synchronizing ring 18 is as before pressed by the second spring device 20 against the synchronizing area 19 of the inner disc carrier 2A.

With increasing displacement of the piston unit 14 towards the pressure chamber 27, the frictional engagement between the synchronizing area 19 and the synchronizing ring 18 is also removed. Then, there is no longer any connection between the rotating transmission components 5 or the planetary gearwheel support 21 and the inner disc carrier 2A, and the rotation speed of the inner disc carrier 2A is, accordingly, reduced to zero by the disc pack 16. This results from the fluid friction between the discs 2B and 3B. In this condition of the shift control element 1, any drag torque between the outer discs 3B and the inner discs 2B is eliminated.

This condition of the shift control element 1 is the one illustrated in FIG. 7 and characterized by the situation represented in FIGS. 3, 4 and 5 at time t_0. The control pressure p_se is then at a value such that the functional components of the shift control element 1 transmit no force flow via the shift control element 1, either by frictional or by positive-locking engagement. Furthermore, there is no speed difference Δn_se between the inner discs 2B and the outer discs 3B. In this condition, the drag torque of the multiple-disc brake is reduced to zero and there is only a considerably lower drag torque between the synchronizing ring 18 and the synchronizing area 19 of the coupling device 6, between which there is now a speed difference.

In an advantageous embodiment of the invention, it is provided that the common control of the positive-locking element 9 and the halves 2, 3 of the shift control element 1 described in connection with FIG. 6, is actively associated with the actuator 28 shown in FIG. 7, and all the functional components of the shift control element 1, i.e., the synchromesh device 7, the positive-locking element 8 of the coupling device 6, the halves 2 and 3 of the shift control element 1 and the positive-locking element 9, are controlled by a single actuator device 13.

Moreover, in a further advantageous embodiment of the transmission, according to the invention, it can be provided that between each of the shift control element halves 2, 3 and the associated rotating and/or non-rotating transmission components 5, 4, a coupling device 6 in each case with a synchromesh device 7 and a positive-locking element 8 is provided. This makes it possible to uncouple the transmission components on both sides of the shift control element 1 and so to avoid drag torques. This is particularly advantageous especially in the case of a multiple-disc clutch or another frictional shift control element which is in active connection with rotating transmission components on both the input and the output sides.

REFERENCE NUMERALS

1 Shift control element
2 First half of the shift control element
2A Inner disc carrier
2B Inner discs
3 Second half of the shift control element
3A Outer disc carrier
3B Outer discs
4 Non-rotating transmission components
5 Rotating transmission components
6 Coupling device
7 Synchromesh device
8 Positive-locking function
9 Positive-locking element
10 Intermediate mass
11 Functional block
12 Further functional block
13 Actuator
14 Piston unit
15 Transmission shaft
16 Disc pack
17 First spring device
18 Friction surface element, synchronizing ring
19 Synchronizing area
20 Second spring device
21 Planetary gearwheel support
22 Toothed profile
23 Toothed profile
24 Third spring device
25 Entrainment element
26 Striker
27 Pressure chamber
28 Actuator
29 Abutment
$\Delta n\_se$ Speed difference
$\Delta n\_syn$ Synchronized speed
$p\_h$ Holding pressure
$p\_se$ Control pressure
$t$ Time
$t\_0$ to $t\_8$ Points in time

The invention claimed is:

1. A method for controlling a transmission having at least one shift control element (1), the method comprising the steps of:
   frictionally engaging at least two shift control element halves (2, 3), each being able to be connected to a non-rotating transmission component (4) and a rotating transmission component (5);
   providing a positive-locking coupling device (6) at least between one of the shift control element halves and the transmission component that can be connected thereto, and engaging the at least one shift control element (1) by the steps of;
   a) sychronizing disengagement of a coupling device (6) to uncouple the rotating transmission element (5) from a first half (2) of the shift control element halves (2, 3) so that the rotating transmission element is no longer moving relative to a second half (3) of the shift control element halves (2, 3),
   b) engaging a positive-locking element (8) of the positive-locking coupling device (6); and
   c) frictionally engaging the shift control element halves (2, 3), and
   d) engaging a form-locking element (9 or 9A) of the shift control element (1) after the frictional engagement of the shift control element halves (2, 3).

2. The method according to claim 1, further comprising the step of reducing the transmission ability between the shift control element halves (2, 3) by releasing the frictional engagement after the positive-locking element (9 or 9A) is engaged.

3. The method according to claim 2, further comprising the step of establishing frictional engagement between the shift control element halves (2, 3) to disengage the shift control element (1).

4. The method according to claim 3, further comprising the step of disengaging the form-locking element (9 or 9A) of the shift control element (1) when the frictional engagement between the shift control element halves (2, 3) has been established.

5. The method according to claim 4, further comprising the step of removing the frictional engagement between the shift control element halves (2, 3) is removed after the disengaging of the form-locking element (9 or 9A) of the shift control element (1).

6. The method according to claim 5, further comprising the step of disengaging the form-locking element (8) of the positive-locking coupling device (6) when the frictional engagement between the shift control element halves (2, 3) has been released.

7. The method according to claim 6, further comprising the step of disengaging the frictional element (7) of the positive-locking coupling device (6) once the positive-locking element (8) of the positive-locking coupling device (6) are disengaged.

* * * * *